United States Patent
Boskovic

[11] Patent Number: 5,551,864
[45] Date of Patent: Sep. 3, 1996

[54] CORE LIFTER SYSTEM

[76] Inventor: Borislav Boskovic, 2102 Bannockburn, Inverness, Ill. 60067

[21] Appl. No.: 372,030

[22] Filed: Jan. 12, 1995

[51] Int. Cl.$^6$ ................................................ B29C 45/44
[52] U.S. Cl. .......................... 425/556; 264/334; 425/438; 425/444; 425/577; 425/DIG. 10
[58] Field of Search ...................... 425/556, 577, 425/444, 441, 438, 468, DIG. 10, DIG. 58; 264/334

[56] References Cited

U.S. PATENT DOCUMENTS

| | | | |
|---|---|---|---|
| 3,293,697 | 12/1966 | Balint | 425/441 |
| 3,454,693 | 7/1969 | Crenshaw | 425/DIG. 58 |
| 3,807,682 | 4/1974 | Catinella et al. | 425/444 |
| 3,843,088 | 10/1974 | McLoughlin et al. | 425/577 |
| 3,865,529 | 2/1975 | Guzzo | 425/577 |
| 4,101,256 | 7/1978 | White et al. | 425/DIG. 58 |
| 4,206,799 | 7/1980 | McDonald | 425/556 |
| 4,854,849 | 8/1989 | Sudo | 425/556 |
| 4,956,142 | 9/1990 | Mangone, Jr. | 425/577 |
| 5,136,467 | 8/1992 | Starkey | 425/444 |
| 5,137,442 | 8/1992 | Starkey | 425/438 |
| 5,281,127 | 1/1994 | Ramsey | 425/556 |

FOREIGN PATENT DOCUMENTS

| | | | |
|---|---|---|---|
| 55-152034 | 11/1980 | Japan | 425/441 |
| 876459 | 10/1981 | U.S.S.R. | 425/441 |

*Primary Examiner*—Jay H. Woo
*Assistant Examiner*—Duane S. Smith
*Attorney, Agent, or Firm*—Lee, Mann, Smith, McWilliams, Sweeney & Ohlson

[57] ABSTRACT

A core lifter system is provided for a plastic injection mold, particularly for use in a mold in which an undercut is to be formed in the molded part. The system has a core blade and a support for the core blade, with the support being formed to be mounted for linear translation on an ejector plate. The system is configured for fixedly retaining the core blade on the blade support at a desired angle of inclination of the blade relative to the support. In one form of the invention, the blade is adjustable, and pinned in place. In another form of the invention, a separate, inclined blade support is provided for each different angle of inclination desired for the blade, and the blade and the support are pinned together.

8 Claims, 4 Drawing Sheets

FIG. I

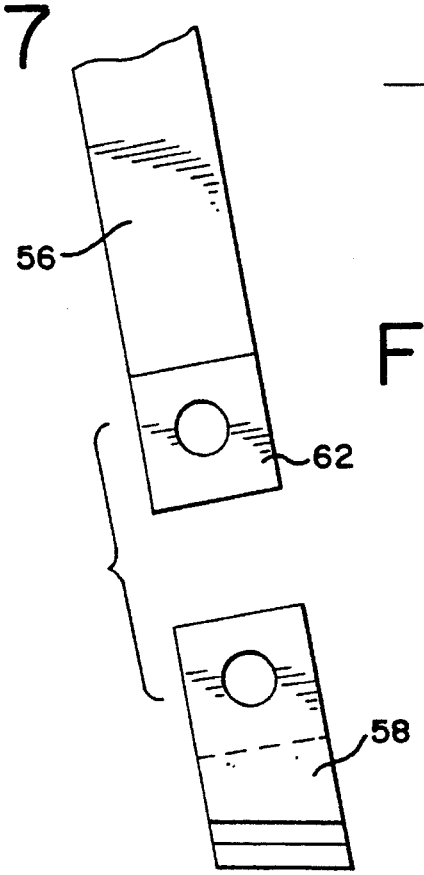
FIG. 7
FIG. 9
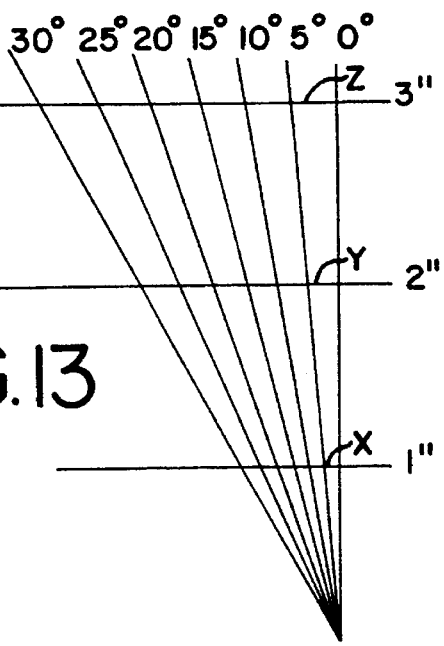
FIG. 13
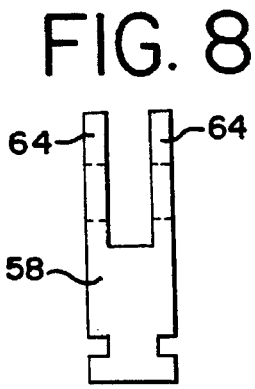
FIG. 8
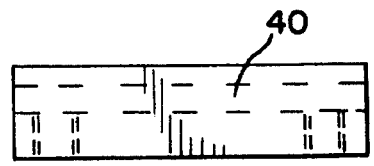
FIG. 11
FIG. 12
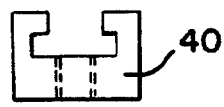
FIG. 10
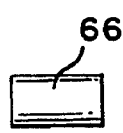

5,551,864

CORE LIFTER SYSTEM

BACKGROUND OF THE INVENTION

This invention relates to plastic injection molding, and in particular to a core lifter system for use in a plastic injection mold where a part is to be formed having an undercut.

Core lifters are used, typically in plastic injection molds, to aid in forming a plastic part which has an undercut which could not normally be formed without employing a mold element that can move out of engagement when the mold is being opened. Core lifters are provided in various sizes and shapes and are inclined at an angle in the mold so that when the mold is parted, the lifter can be moved out of engagement with the plastic part to permit and aid the part in being ejected from the mold.

Typical core lifters in the past are provided with a fixed slide and an inclined lifter arm extending at a fixed angle from the slide. For each different angle of inclination, a different lifter is required to be provided, an expensive proposition if different parts are desired to be molded.

U.S. Pat. No. 5,137,442 provides a universal core lifter in which the core blade is pivotal relative to its support so that the core blade can be oriented at any of a number of desired angles. Thus, an entire core lifter need not be provided each time a different angle is desired. Changing of the blade, or changing of the angle of the blade, is all that is necessary.

While the lifter of Pat. No. 5,137,442 is a substantial improvement over the prior art, since the lifter comprises three parts, it can be relatively expensive. In addition, the core blade interfaces with a relatively complex universal coupling, requiring precise machining of the blade and the couplings so that they function together. However, that also increases the cost of the parts.

SUMMARY OF THE INVENTION

The invention is directed to an improved core lifter system for a plastic mold. The invention includes a core blade having a mold-cooperating end and an opposite coupling end. A blade support is provided, and is formed to be mounted on an ejector plate of an injection mold. The blade support has means for permitting linear translation of the support on the ejector plate, and also has means for connecting the coupling end of the core blade to the support. Means is also provided for fixedly retaining the core blade on the blade support at a desired angle of inclination of the blade relative to the support. In the preferred form of the invention, the connecting means comprises a pair of spaced arms extending from the blade support, with the coupling end of the core blade being sandwiched between the arms.

In accordance with one form of the invention, the core blade is adjustably mounted between the spaced arms. In this form of the invention, the adjustable mounting is by means of a central pin securing the core blade to the arms. The retaining means comprises a dowel which extends through the arms and the coupling end to fix the core blade at the desired angle of inclination.

In a second form of the invention, the spaced arms are formed on the blade support at substantially the desired angle of inclination. The blade support is configured between the arms to conform to the coupling end, and for retaining the blade in place, a central pin is provided, extending through the arms and the coupling end of the core blade. A different blade support is therefore provided for each different desired angle of inclination of the core blade.

BRIEF DESCRIPTION OF THE DRAWINGS

The invention is described in greater detail in the following description of examples embodying the best mode of the invention, taken in conjunction with the drawing figures, in which:

FIG. 7 is an elevational view of a portion of a core blade according to the second form of the invention and its blade support, FIG. 8 is an elevational view of the blade support of the second form of the invention, taken from the right in FIG. 7, FIG. 9 is a side elevational view of a track or gib which can be mounted on an ejector plate in a plastic mold to permit required linear travel of the core blade and blade support, FIG. 10 is an end elevational view of the track shown in FIG. 9, FIG. 11 is a plan view of a roll pin used to connect the two portions of the invention shown in FIG. 7, FIG. 12 is an end view of the roll pin of FIG. 11, and FIG. 13 shows an array of different angles at which the core blade can be oriented within the injection mold.

DESCRIPTION OF AN EXAMPLE EMBODYING THE BEST MODE OF THE INVENTION

Figure 1:
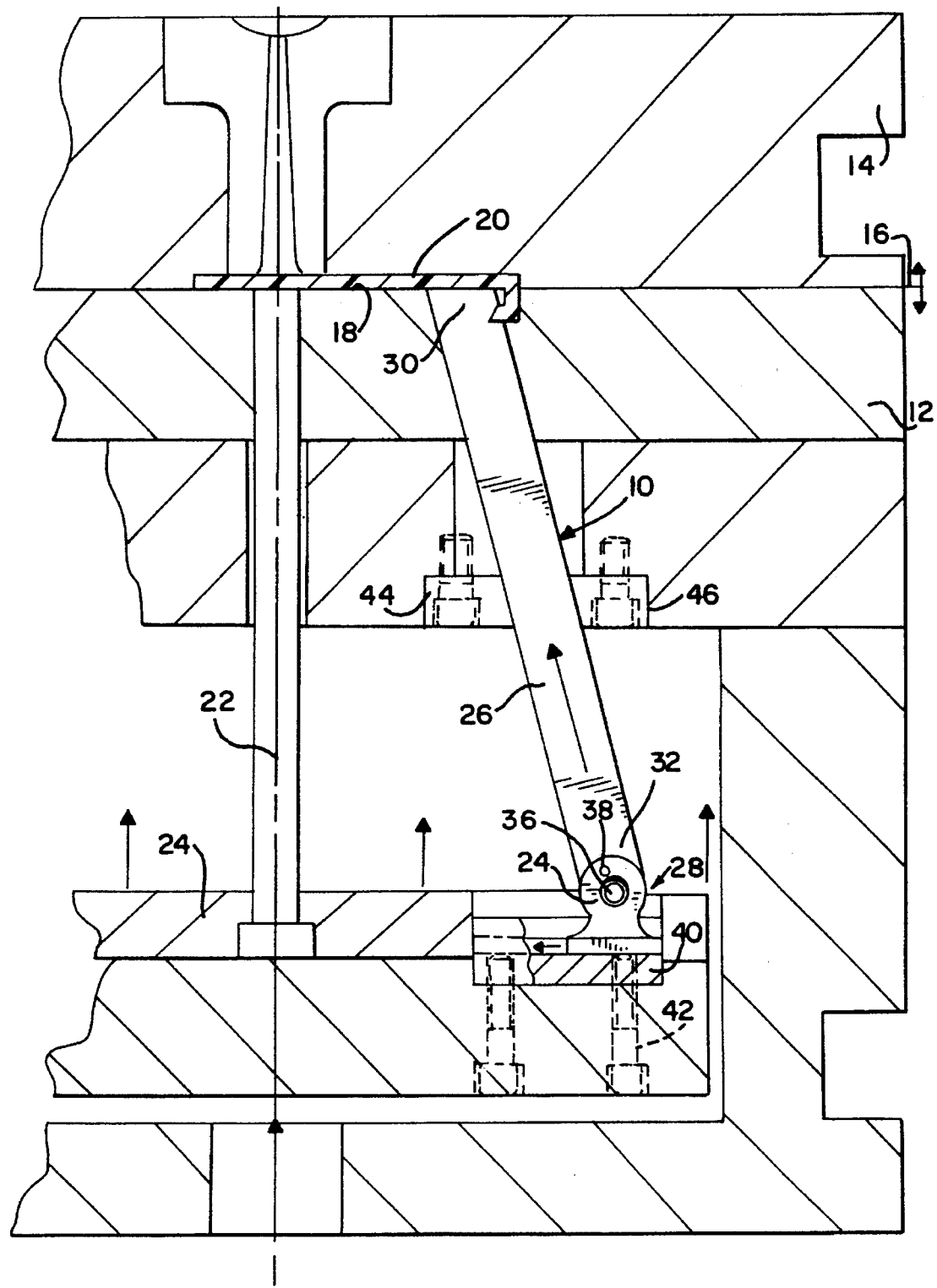
FIG. 1 is a partial elevational and cross-sectional view of a plastic injection mold, showing in elevation a core lifter system according to the invention when installed in the mold.

A core lifter system according to the invention is shown generally at 10 in FIG. 1. The core lifter system 10 is intended to be installed in an appropriate plastic mold, such as a plastic injection mold, and one form of plastic injection mold is shown in the drawing figures. As is typical, the plastic injection mold comprises a lower core plate 12 and an upper cavity plate 14 which separate along a parting line 16. An appropriate cavity 18 is formed in the core and cavity plates for injection of a plastic part 20. As is typical, the mold may also include one or more ejector pins 22 which extend from a vertically movable ejector plate 24. All of these elements of the mold are conventional, and are therefore not described in greater detail. Different parts can be used depending on the nature of the mold and the use of the lifter system 10 according to the invention. The cavity 18 is injected with plastic for the plastic part 20 in a conventional fashion which also does not form any part of the invention.

The lifter system 10 comprises two basic components, a core blade 26 and a blade support 28. The core blade 26 includes an upper mold-cooperating end 30, which can be formed to cooperate with the core plate 12 to form an undercut in the part 20, as shown in FIG. 1. The opposite end of the core blade 26 is a coupling end 32, which is installed between a pair of arms 34 of the blade support 28. The core blade 26 is secured between the arms 34 by means of a central pin 36 which passes through appropriate apertures in the arms 34 and the coupling end 32 of the core blade 26. Therefore, the angle of inclination of the core blade 26 in relation to the blade support 28 is initially adjustable, as desired.

Once the angle of the core blade 26 in relation to the blade support 28 is determined, the core blade 26 is fixedly retained in place. This is accomplished by means of a dowel 38 which passes through the arms 34 and the coupling end 32 of the core blade 26. When the dowel 38 is installed, the core blade 26 cannot be adjusted relative to the blade support 28. Preferably, the lifter system according to the invention is provided with an appropriate aperture in the arms 34 for passage of the dowel 38, but no aperture is provided in the core blade 26. When the angle of the core blade 26 is determined, the system is drilled through the apertures in the arms 34, thus providing an appropriate aperture in the core blade 26 so that the dowel 38 can be installed to lock the core blade 26 in place.

Figure 2:
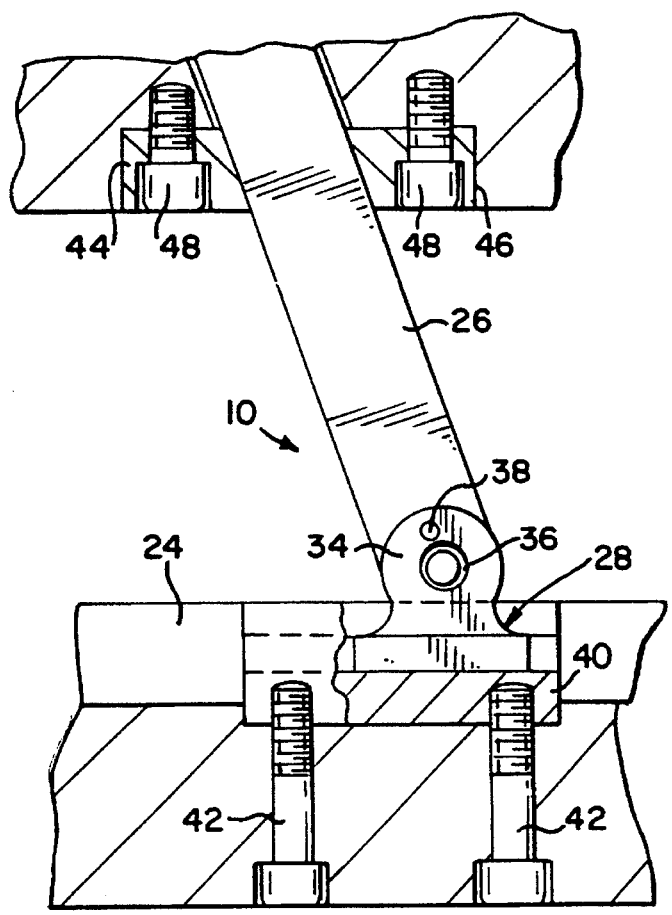
FIG. 2 is an enlarged elevational view of a portion of the core lifter system according to the invention, showing the core blade installed in the blade support with environmental portions of the mold being illustrated, as well.
Figure 3:
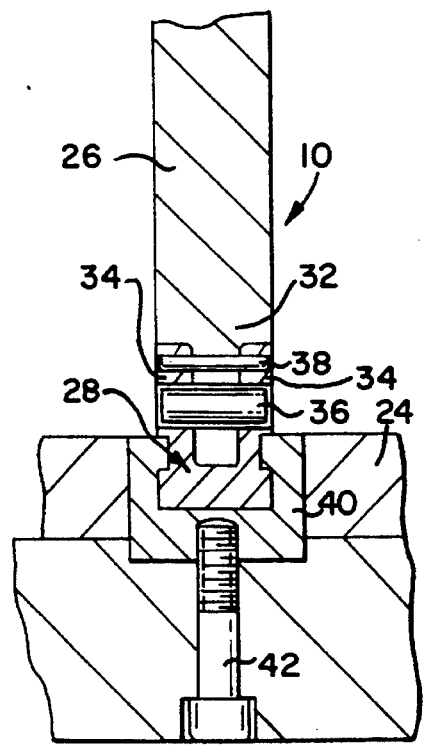
FIG. 3 is an elevational view taken from the right of FIG. 2, and with the upper portions of the mold being eliminated for clarity.
Figure 4:
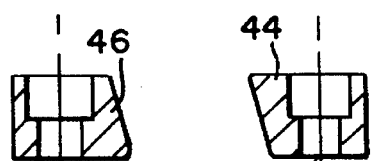
FIG. 4 is a cross-sectional illustration of guides used in connection with the core blade of the invention for orienting the blade in the upper half of the injection mold.
Figure 5:
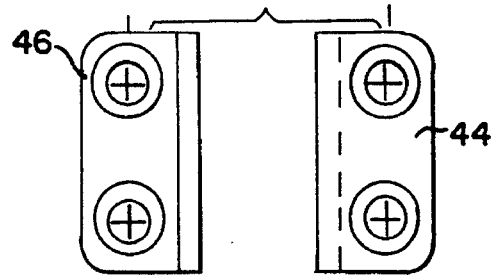
FIG. 5 is a top plan view of the guides of FIG. 4.
Figure 6:
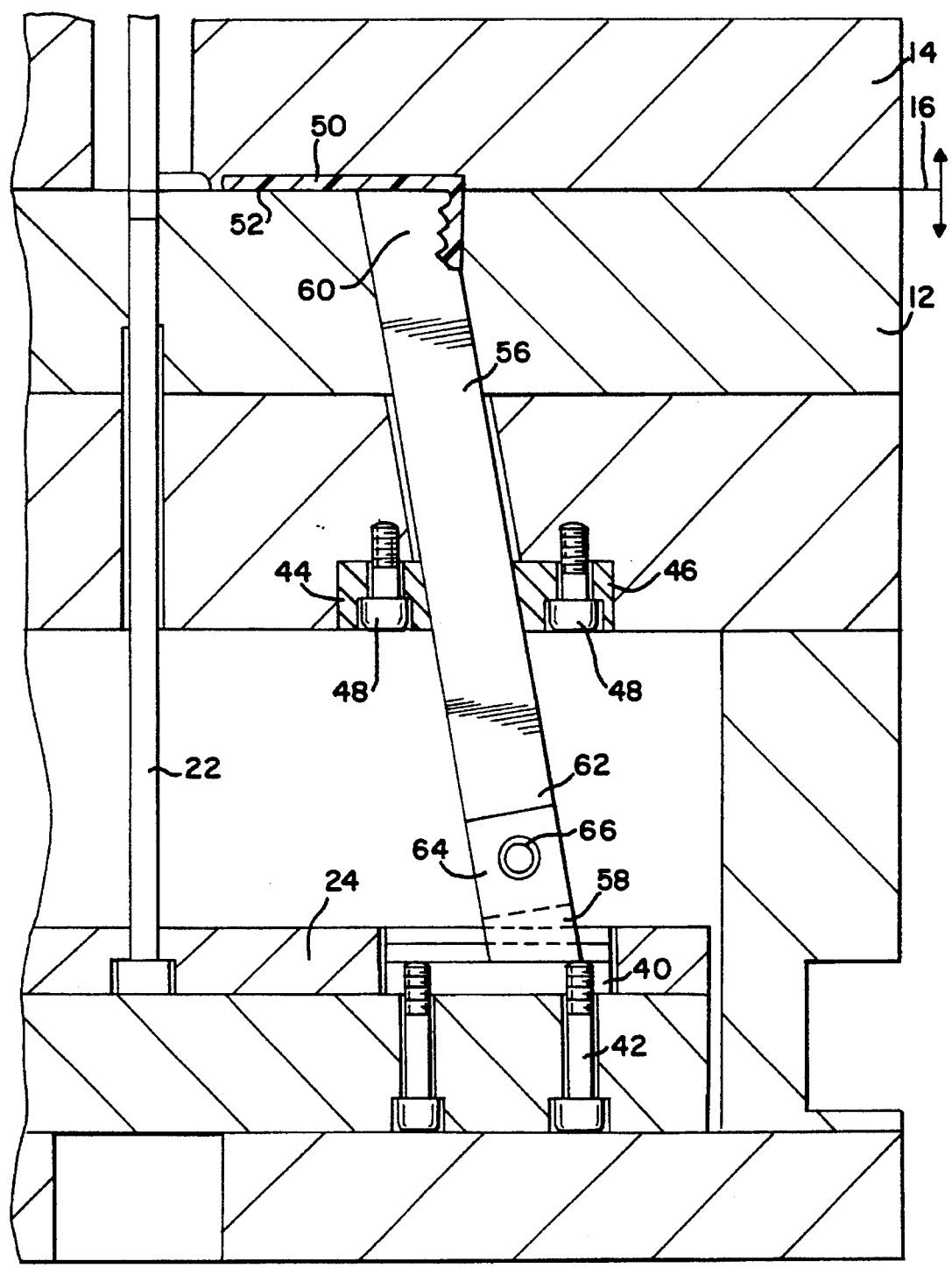
FIG. 6 is a partial elevational and cross-sectional view similar to FIG. 1, but illustrating a second form of core lifter system according to the invention.

The blade support 28 is formed to be mounted within a track or gib 40. As shown in FIGS. 1 through 3, the gib 40 is bolted to the ejector plate 24, while the blade support 28 is free to travel linearly in the gib 40. One or more bolts 42 is used to fix the gib 40 in place in the ejector plate 24.

As is conventional, the lifter system 10 travels with the vertical movement of the ejector plate 24 in relation to the core plate 12. To guide the core blade 26 into the core plate 12, a pair of guides 44 and 46 are bolted to the core plate 12, such as with bolts 48. The guides 44 and 46 have inclined faces which are machined at the desired angle of inclination of the core blade 26 to guide the core blade when the ejector plate 24 is operated in its vertical path.

In operation, the lifter system 10 is utilized in connection with an injection mold in a conventional fashion. The mold-cooperating end 30 of the core blade 26 is machined to cooperate with the mold, and after the plastic part 20 has been ejected, the core plate 12 and cavity plate 14 are separated. At the same time, the ejector plate 24 begins its vertical travel. Since the core blade 26 is oriented at an angle in the core plate 12, as the mold is opened and the ejector plate 24 is raised, the mold-cooperating end 30 moves to the left (in relation to FIG. 1) relative to the plastic part 20, which is pushed upwardly by the ejector pin 22 and the core blade 26. Thus, the plastic part 20 is freed from the mold without interference of the core blade 26, and the mold can then be reclosed along the parting line 16 for the next injection process.

FIGS. 6 through 12 illustrate a second form of the invention, again installed within a plastic injection mold. Common elements of the mold bear the same reference numerals, and are therefore not described in greater detail.

In this form of the invention, a slightly different plastic part 50 is formed in a cavity 52 in cooperation with a lifter system 54. The lifter system 54 is comprised of a core blade 56 and a blade support 58. As in the first form of the invention, the core blade 56 includes a mold-cooperating end 60 and a coupling end 62 installed between a pair of spaced arms 64 of the blade support 58. The blade support 58 is properly formed to cooperate with and linearly travel within the gib 40.

In this form of the invention, in order to orient the core blade 56 at a desired angle within the injection mold, the arms 64 are inclined at the desired angle of inclination. As best seen in FIGS. 7 and 8, the blade support 58 is configured between the arms 64 to exactly accommodate the coupling end 62. A central pin 66, installed within appropriate apertures in the arms 64 and the coupling end 62, fixes the core blade 56 and blade support 58 together and also fixes the angle of inclination of the core blade 56. Thus, for each desired different angle of inclination, as depicted schematically in FIG. 13, a different blade support 58 is provided, with the arms 64 being disposed at the desired angle of inclination.

For maximum durability and life, all parts of the lifter systems 10 and 54 are preferably metal, although other materials can be used if of sufficient durability. Also, while the core blades 26 and 56 are shown to be generally rectangular elements, it is evident that the blades may take on whatever shapes are desired for formation of an undercut portion of a plastic part.

Various changes can be made to the invention without departing from the spirit thereof or scope of the following claims.

What is claimed is:

1. A core lifter system for a plastic mold, comprising
   a. a core blade having a mold-cooperating end and an opposite coupling end,
   b. a blade support said blade support having means for mounting said blade support on an ejector plate and for permitting linear translation of the support on the ejector plate, and having means for connecting said coupling end to said support, and
   c. means in said core blade and said blade support for fixedly retaining said core blade on said blade support at a desired angle of inclination of said blade relative to said support.

2. A core lifter system according to claim 1 in which said connecting means comprises a pair of spaced arms extending from said blade support, said coupling end being sandwiched between said arms.

3. A core lifter system according to claim 2 in which connecting means include means adjustably mounting said core blade.

4. A core lifter system according to claim 3 in which said means adjustably mounting comprises a central pin.

5. A core lifter system according to claim 3 in which said retaining means comprises a dowel extending through said arms and said coupling end.

6. A core lifter system according to claim 2 in which said arms are inclined at substantially said desired angle of inclination.

7. A core lifter system according to claim 6 in which said blade support is configured between said arms to conform to said coupling end.

8. A core lifter system according to claim 6 in which said retaining means comprises a central pin extending through said arms and said coupling end.

* * * * *